United States Patent
Yoshimura et al.

(10) Patent No.: US 12,525,407 B2
(45) Date of Patent: Jan. 13, 2026

(54) ELECTRODE FOIL FOR ELECTROLYTIC CAPACITORS, AND ELECTROLYTIC CAPACITOR

(71) Applicant: Panasonic Intellectual Property Management Co., Ltd., Osaka (JP)

(72) Inventors: Mitsuhisa Yoshimura, Osaka fu (JP); Toshifumi Kadokawa, Osaka fu (JP); Masami Tsubaki, Kyoto fu (JP); Yuji Otsuka, Yamaguchi ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 263 days.

(21) Appl. No.: 18/263,093

(22) PCT Filed: Jan. 24, 2022

(86) PCT No.: PCT/JP2022/002451
§ 371 (c)(1),
(2) Date: Jul. 26, 2023

(87) PCT Pub. No.: WO2022/163587
PCT Pub. Date: Aug. 4, 2022

(65) Prior Publication Data
US 2024/0304396 A1   Sep. 12, 2024

(30) Foreign Application Priority Data
Jan. 29, 2021   (JP) ................................ 2021-014007

(51) Int. Cl.
*H01G 9/055* (2006.01)
*H01G 9/145* (2006.01)
*H01G 9/15* (2006.01)

(52) U.S. Cl.
CPC ............. *H01G 9/055* (2013.01); *H01G 9/145* (2013.01); *H01G 9/151* (2013.01)

(58) Field of Classification Search
CPC ........ H01G 9/145; H01G 9/151; H01G 9/048; H01G 9/055
See application file for complete search history.

(56) References Cited

U.S. PATENT DOCUMENTS 5,968,210 A * 10/1999 Strange .................... H01G 9/00
                                                     29/25.03
6,243,256 B1 * 6/2001 Furuta .................... H01G 9/055
                                                     29/25.03

(Continued)

FOREIGN PATENT DOCUMENTS

JP    S53-124754 A    10/1978
JP    2006-124805 A   5/2006

(Continued)

OTHER PUBLICATIONS

International Search Report dated Apr. 19, 2022 issued in International Patent Application No. PCT/JP2022/002451, with English translation.

*Primary Examiner* — David M Sinclair
(74) *Attorney, Agent, or Firm* — Rimon P.C.

(57) ABSTRACT

An electrode foil for an electrolytic capacitor includes a metal foil that includes a porous portion and a core portion continuous to the porous portion. The metal foil has a main surface in which pores in the porous portion are open. The porous portion includes a plurality of recessed portions that are open in the main surface and distributed in a dot pattern in an in-plane direction of the metal foil. The pores in the porous portion have an opening length smaller than 2 μm, and the recessed portions have an opening length of 2 μm or more.

23 Claims, 7 Drawing Sheets

(56) References Cited

U.S. PATENT DOCUMENTS

| | | | | |
|---|---|---|---|---|
| 6,375,688 B1* | 4/2002 | Akami | ............... | H01G 11/56 |
| | | | | 29/25.03 |
| 10,957,491 B2* | 3/2021 | Kubo | .................. | H01G 9/028 |
| 2003/0007312 A1* | 1/2003 | Yamazaki | ............. | H01G 9/055 |
| | | | | 361/302 |
| 2008/0285210 A1* | 11/2008 | Oh | ................... | H01G 9/0032 |
| | | | | 29/25.03 |
| 2018/0315552 A1 | 11/2018 | Narita et al. | | |

FOREIGN PATENT DOCUMENTS

| | | |
|---|---|---|
| JP | 2007-318007 A | 12/2007 |
| JP | 2013-153024 A | 8/2013 |
| JP | 2017-224844 A | 12/2017 |

* cited by examiner

ELECTRODE FOIL FOR ELECTROLYTIC CAPACITORS, AND ELECTROLYTIC CAPACITOR

CROSS-REFERENCE OF RELATED APPLICATIONS

This application is the U.S. National Phase under 35 U.S.C. § 371 of International Patent Application No. PCT/JP2022/002451, filed on Jan. 24, 2022, which in turn claims the benefit of Japanese Patent Application No. 2021-014007, filed on Jan. 29, 2021, the entire disclosures of which Applications are incorporated by reference herein.

TECHNICAL FIELD

The present invention relates to an electrode foil for an electrolytic capacitor and an electrolytic capacitor.

BACKGROUND ART

A metal foil that includes a porous portion and a core portion continuous to the porous portion is used for an electrode foil in an electrolytic capacitor. The porous portion is formed by etching the metal, for example. Due to the formation of the porous portion, the surface area of the electrode foil increases and the capacitance of the electrolytic capacitor increases.

PTL 1 discloses a band-shaped electrode foil including a surface enlarged part formed at a surface of the foil and a core part, which is the remaining part of the electrode foil other than the surface enlarged part, and discloses providing a plurality of separation parts extending in the width direction of the electrode foil and dividing the surface enlarged part.

CITATION LIST

Patent Literature

PTL 1: Japanese Laid-Open Patent Publication No. 2017-224844

SUMMARY OF INVENTION

Technical Problem

As a result of providing the separation parts, a pushing depth (Erichsen value) in an Erichsen test increases. However, the separation parts extend in the width direction of the electrode foil, and the electrode foil has low tensile strength in the length direction thereof and low folding endurance in the width direction thereof, and is likely to break in a process for producing the electrode foil. The breakage of the electrode foil occurs as a result of cracks being formed in the width direction of the electrode foil along the separation parts due to tension generated when the electrode foil is conveyed by a conveyance roller or a bending stress generated when the electrode foil is wound by a winding roller, for example.

Also, the electrode foil including the separation parts may break due to a bending stress generated when the electrode foil is curved in a process for producing an electrolytic capacitor using the electrode foil. The electrode foil is curved when the electrode foil is wound in a process for producing a wounded body or when the electrode foil sags while being conveyed, for example. Moreover, in a case where the process for producing an electrolytic capacitor includes a step in which the electrode foil is twisted in such a manner as to face a different direction, a stress generated due to the electrode foil being twisted may concentrate in a separation part, and the electrode foil may break.

Solution to Problem

An aspect of the present invention relates to an electrode foil for an electrolytic capacitor, including a metal foil that includes a porous portion and a core portion that is continuous to the porous portion, wherein the metal foil has a main surface in which pores in the porous portion are open, the porous portion includes a plurality of recessed portions that are open in the main surface and distributed in a dot pattern in an in-plane direction of the metal foil, the pores in the porous portion are smaller than 2 μm, and the recessed portions have an opening length of 2 μm or more.

Another aspect of the present invention relates to an electrolytic capacitor including a wound body and an electrolyte, wherein the wound body is obtained by winding together a band-shaped anode foil, a band-shaped cathode foil arranged opposite to the anode foil, and a separator foil arranged between the anode foil and the cathode foil, at least one of the anode foil and the cathode foil includes a metal foil that includes a porous portion and a core portion that is continuous to the porous portion, the metal foil has a main surface in which pores in the porous portion are open, the porous portion includes a plurality of recessed portions that are open in the main surface and distributed in a dot pattern in an in-plane direction of the metal foil, the pores in the porous portion are smaller than 2 μm, and the recessed portions have an opening length of 2 μm or more.

Advantageous Effects of Invention

According to the present invention, it is possible to suppress breakage of an electrode foil for an electrolytic capacitor.

BRIEF DESCRIPTION OF DRAWINGS

FIGS. 3A to 3H show variations of recessed portions shown in FIG. 1.

DESCRIPTION OF EMBODIMENTS

Although novel features of the present invention are described in the claims, the following detailed description referring to the drawings together with other objects and features of the present invention will further facilitate understanding of both the configuration and the content of the present invention.

[Electrode Foil for Electrolytic Capacitor]

An electrode foil for an electrolytic capacitor according to an embodiment of the present invention includes a metal foil that includes a porous portion and a core portion that is continuous to the porous portion. The metal foil has a main surface (hereinafter also referred to as a "main surface S") in which pores in the porous portion are open. The porous portion includes a plurality of recessed portions that are open in the main surface S. The plurality of recessed portions are distributed in a dot pattern in an in-plane direction of the metal foil (as viewed from the main surface S side). An opening length of the recessed portions is larger than an opening length of the pores in the porous portion. That is, the pores in the porous portion are smaller than 2 µm, and the opening length of the recessed portions is 2 µm or more. In the present specification, "the maximum length of an opening" is simply referred to as the "opening length". That is, the opening length of the recessed portions means the maximum length of the openings of the recessed portions. The opening length of the pores in the porous portion means the maximum length of the openings of the pores. In the following description, the plurality of recessed portions distributed in a dot pattern in the in-plane direction of the metal foil and having an opening length of 2 µm or more will also be referred to as a "group of recessed portions". The plurality of recessed portions are spaced apart from each other in the porous portion.

In a process for producing a conventional electrode foil (electrolytic capacitor), the electrode foil may break as a result of linear cracks being formed along the width direction of the band-shaped electrode foil due to tension generated in the longitudinal direction of the band-shaped electrode foil and a bending stress generated in the width direction. In the case of a band-shaped electrode foil that includes narrow separation parts extending in the width direction, the tensile strength of the electrode foil in the length direction and the folding endurance of the electrode foil in the width direction are low, and the electrode foil is likely to break as described above.

Figure 7:
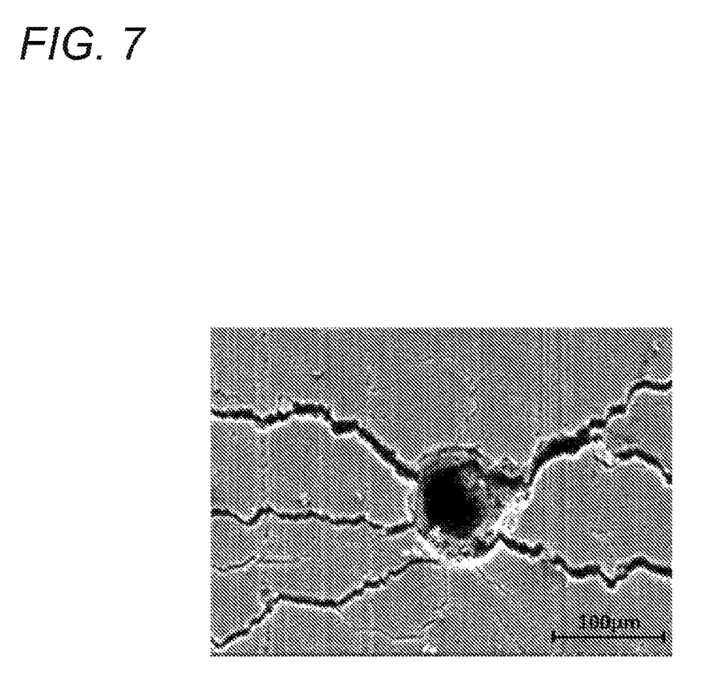
FIG. 7 is an SEM image showing an electrode foil for an electrolytic capacitor according to an embodiment of the present invention after tension was applied.

In contrast, the electrode foil according to the present embodiment has high tensile strength because the porous portion includes the group of recessed portions. In the case where the electrode foil has a band shape, the electrode foil has the high tensile strength in both the length direction and the width direction. When a stress is applied to the electrode foil as a result of the electrode foil being pulled, minute cracks are formed in such a manner as to radially extend from inner walls of the recessed portions as viewed from the main surface S side, and the stress is distributed and mitigated. Therefore, the electrode foil is kept from breaking due to tension generated when the electrode foil is conveyed by a conveyance roller. FIG. 7 is an SEM image showing an electrode foil for an electrolytic capacitor according to an embodiment of the present invention after tension was applied. FIG. 7 shows a state where cracks radially extending from a recessed portion were formed as a result of tension being applied to the electrode foil.

Moreover, the electrode foil according to the present embodiment has high folding endurance because the porous portion includes the group of recessed portions. In the case where the electrode foil has a band shape, the electrode foil has the high folding endurance in both the length direction and the width direction. When the electrode foil is curved, minute cracks are formed in such a manner as to radially extend from inner walls of the recessed portions as viewed from the main surface S side, and a bending stress generated in the electrode foil is distributed and mitigated due to the formation of the cracks. Therefore, the electrode foil is kept from breaking as a result of being curved (e.g., when the electrode foil is wound during production of the electrode foil or a wound body, or when the electrode foil sags while being conveyed) or twisted.

However, even when the opening length of the recessed portions is larger than the opening length of the pores in the porous portion, if the opening length of the recessed portions is less than 2 µm, radially extending minute cracks are unlikely to be formed, and the folding endurance may decrease.

From the viewpoint of improving the tensile strength and the folding endurance, the recessed portions may extend obliquely with respect to the main surface S. From the viewpoint of easily forming the recessed portions, the recessed portions may extend substantially perpendicularly to the main surface S. Note that the description "extending substantially perpendicularly to the main surface S" means that the recessed portions extend at an angle of 800 to 1000 with respect to the main surface S.

When the maximum length and the minimum length of the opening of a recessed portion are denoted by D1 and D2, respectively, the ratio D2/D1 of the minimum length D2 to the maximum length D1 of the opening of the recessed portion may be 0.1 or more and 1 or less, 0.2 or more and 0.8 or less, or 0.4 or more and 0.75 or less, for example.

Examples of the shape of the recessed portions include columnar shapes (for example, a circular column shape and polygonal column shapes such as a rectangular column shape), cone or pyramid shapes (for example, a cone shape and pyramid shapes such as a quadrangular pyramid shape), and truncated cone or pyramid shapes (for example, a truncated cone shape and truncated pyramid shapes such as a truncated quadrangular pyramid shape).

From the viewpoint of increasing the folding endurance of the electrode foil, the opening length (the maximum length D1) of the recessed portions is preferably 4 µm or more, and more preferably 8 µm or more. From the viewpoint of improving the folding endurance and securing the tensile strength of the electrode foil, the opening length of the recessed portions is preferably 120 µm or less, more preferably 100 µm or less, and further preferably 80 µm or less. The above-described upper limits and lower limits of the opening length of the recessed portions may be combined suitably. For example, the opening length of the recessed portions may be 2 µm or more and 120 µm or less, 4 µm or more and 120 µm less, or 8 µm or more and 100 µm or less.

From the viewpoint of increasing the folding endurance of the electrode foil, the number of recessed portions per 1 mm² of the main surface S may be 4 or more, 10 or more, or 30 or more. From the viewpoint of improving the folding endurance and securing the tensile strength of the electrode foil, the number of recessed portions per 1 mm² of the main surface S may be 62500 or less, 40000 or less, 20000 or less, 7000 or less, or 625 or less. The above-described upper limits and lower limits of the number of recessed portions per 1 mm² of the main surface S may be combined suitably. For example, the number of recessed portions per 1 mm² of the main surface S may be 4 or more and 40000 or less, or 30 or more and 7000 or less. The number of recessed portions per 1 mm² of the main surface S may also be 10 or more and 62500 or less. A large number of recessed portions having a small opening length may be formed in the porous portion. For example, 20000 recessed portions having an opening length of 5 μm or less may be formed per 1 mm² of the main surface S.

The metal foil may have a band shape and the recessed portions may be arranged in the length direction of the metal foil and the width direction of the metal foil. In this case, the number Nx of recessed portions arranged in the length direction of the metal foil per 1 mm in the length direction of the metal foil and the number Ny of recessed portions arranged in the width direction of the metal foil per 1 mm in the width direction of the metal foil preferably satisfy a relationship: Nx/Ny<1. More preferably, Nx and Ny satisfy a relationship: Nx/Ny<0.9. Nx/Ny falling within the above range is advantageous in terms of improving the tensile strength in the longitudinal direction of the metal foil and improving the folding endurance in the width direction of the metal foil.

From the viewpoint of improving the folding endurance and securing the tensile strength of the electrode foil, an interval W between adjacent recessed portions may be 2 μm or more, 4 μm or more, or 6 μm or more. From the viewpoint of increasing the folding endurance of the electrode foil, the interval W between adjacent recessed portions may be 2400 μm or more, 1200 μm or less, or 800 μm or less. The above-described upper limits and lower limits of the interval W between adjacent recessed portions may be combined suitably. For example, the interval W may be 2 μm or more and 2400 μm or less, or 6 μm or more and 1200 μm or less. Note that the above-described interval W means the minimum distance between adjacent recessed portions.

When adjacent recessed portions both have an opening length (the maximum length of the opening) D1 and are spaced apart from each other by an interval W, the opening length D1 and the interval W preferably satisfy a relationship: D1/W≤2 from the viewpoint of the folding endurance and the tensile strength of the electrode foil. D1/W is 0.005 or more and 2 or less, for example, preferably 0.02 or more and 1 or less, and more preferably 0.1 or more and 1 or less.

The plurality of recessed portions are preferably arranged regularly in the in-plane direction of the metal foil. The plurality of recessed portions are preferably arranged at equal intervals in the in-plane direction of the metal foil. The plurality of recessed portions may be arranged in a staggered manner or in a square lattice pattern in the in-plane direction of the metal foil. In the case where the electrode foil has a band shape, the interval W between recessed portions may be varied in the length direction. In a case where two porous portions are provided in such a manner as to sandwich the core portion, the two porous portions may be the same as each other or different from each other in the size (opening length) of the recessed portions, the shape of the recessed portions, the interval W between the recessed portions, the arrangement of the recessed portions, or the like.

A ratio Da/Dp of an average opening length Da of the recessed portions to an average pore diameter Dp in the porous portion is preferably 20 or more, more preferably 67 or more, and further preferably 67 or more and 800 or less.

The average pore diameter Dp in the porous portion can be determined by measuring a pore diameter distribution in the electrode foil (the porous portion) with use of a mercury porosimeter. Specifically, a pore diameter (a mode diameter) corresponding to a peak (in a case where there is a plurality of peaks, the largest peak) in a pore distribution curve (vertical axis: log differential pore volume, horizontal axis: pore diameter) obtained through the measurement is taken as the average pore diameter Dp. The average pore diameter Dp is measured using the AutoPore V series manufactured by Micromeritics, for example. The pore distribution curve described above shows a distribution of pores having a pore diameter smaller than 2 μm in the porous portion. Commonly, the recessed portions have a very large length (opening length) compared with the pores in the porous portion, and it is difficult to measure the length of the recessed portions with use of the mercury porosimeter under the same conditions as those under which the porous portion is measured.

The average opening length Da of the recessed portions is determined by arbitrarily selecting 20 openings having a maximum length of 2 μm or more as openings of recessed portions in an image of the main surface S of the electrode foil with use of a scanning electron microscope (SEM), measuring maximum lengths D1 of those openings, and calculating the average of the measured values.

Examples of the shape of the openings of the recessed portions include circular shapes, elliptical shapes, polygonal shapes, star shapes, and drop shapes. It is preferable that at least one corner of a polygonal shape is rounded, and it is more preferable that all corners of a polygonal shape are rounded. The openings of the plurality of recessed portions provided in the porous portion may have the same shape or different shapes. The polygonal shapes include triangular shapes, rectangular shapes, hexagonal shapes, and the like. The star shapes include shapes having interior angles of 1800 or more, and representative star shapes are star polygons such as a hexagram and a pentagram. A plurality of sides constituting a star shape may be the same as each other or different from each other.

In the case where the electrode foil has a band shape, the openings of the plurality of recessed portions are preferably formed in such a manner that the direction of the maximum length of the openings is substantially parallel with the length direction of the electrode foil. This configuration is advantageous in improving the tensile strength in the length direction of the electrode foil. For example, in the case where the recessed portions have elliptical openings, the elliptical openings are preferably formed in such a manner that the major axis (the maximum length D1) of the ellipse is substantially parallel with the length direction of the electrode foil. Note that the description "the direction of the maximum length D1 of the openings of the recessed portions is substantially parallel with the length direction of the electrode foil" means that an angle formed between the direction of the maximum length D1 of the openings of the recessed portions and the length direction of the electrode foil is within a range from −20° to 20°.

The porous portion may include a first porous portion and a second porous portion that are arranged in such a manner as to sandwich the core portion. In this case, the metal foil has a first main surface in which pores in the first porous portion are open and a second main surface in which pores in the second porous portion are open. It is sufficient that at least one of the first porous portion and the second porous portion includes a group of recessed portions.

Preferably, each of the first porous portion and the second porous portion includes a group of recessed portions. In this case, the first porous portion includes a plurality of first recessed portions that are open in the first main surface and distributed in a dot pattern in an in-plane direction of the metal foil, and the second porous portion includes a plurality of second recessed portions that are open in the second main surface and distributed in a dot pattern in an in-plane direction of the metal foil. Pores in the first porous portion and pores in the second porous portion each have an opening length smaller than 2 μm, and the first recessed portions and the second recessed portions each have an opening length of 2 μm or more. In the following description, an electrode foil in which the first porous portion and the second porous portion sandwiching the core portion each include a group of recessed portions will also be referred to as an "electrode foil E".

The number of first recessed portions per 1 mm$^2$ of the first main surface may be larger than the number of second recessed portions per 1 mm$^2$ of the second main surface. In the case where the metal foil has a band shape, the number of first recessed portions per 1 mm$^2$ of the first main surface may be larger than the number of second recessed portions per 1 mm$^2$ of the second main surface in at least a region in the length direction of the metal foil. With this configuration, it is possible to effectively distribute a bending stress in the first porous portion (the first main surface side) in which a large bending stress is generated when the electrode foil is wound with the first main surface facing outward.

A depth H of the recessed portions and a thickness T of the porous portion (the thickness of each porous portion) preferably satisfy a relationship: $0.067 \leq H/T \leq 1$. H/T is more preferably 0.083 or more and 1 or less, and further preferably 0.16 or more and 0.67 or less. When H/T is 0.16 or more, the folding endurance of the electrode foil tends to be increased. When H/T is 0.67 or less, the tensile strength of the electrode foil tends to be secured. When H/T is 1 or less, the strength of the electrode foil (the core portion) tends to be secured.

The recessed portions may further extend from the porous portion to the core portion as long as the strength of the electrode foil (the core portion) is secured. In this case, a depth h of the recessed portions in the core portion is 7 μm or less, for example, and may be 4 μm or less.

The depth H of the recessed portions is determined by measuring a distance from the opening of a recessed portion to the bottom of the recessed portion with respect to 10 arbitrarily selected recessed portions with use of an SEM image of a cross section of the electrode foil, and calculating the average of the measured values. The thickness T of the porous portion is determined by measuring the thickness at 10 arbitrarily selected points on the porous portion with use of an SEM image of a cross section of the electrode foil taken along the thickness direction thereof, and calculating the average of the measured values.

(Electrode Foil)

The metal foil used for the electrode foil contains a valve action metal such as aluminum (Al), tantalum (Ta), or niobium (Nb), for example. The metal foil may contain the valve action metal as an alloy or a compound containing the valve action metal. The core portion and the porous portion of the metal foil may be formed as a single piece. For example, the porous portion is formed by roughening a surface of the metal foil containing the valve action metal through etching. The porous portion is an outer portion of the metal foil that includes many pores formed through etching, and the core portion is the remaining inner portion of the metal foil. A band-shaped metal foil is used for the electrode foil, for example, and the width of the metal foil is 1.5 mm or more and 520 mm or less, for example.

The thickness T of the porous portion is not particularly limited, and can be selected as appropriate in accordance with an intended use or a required withstand voltage of the electrolytic capacitor, for example. The thickness T of each porous portion may be 1/10 or more and 5/10 or less of the thickness of the metal foil, for example. In the case of an anode foil, the thickness D of the porous portion is 10 μm or more and 160 μm or less, for example, and may be 50 μm or more and 160 μm or less.

The metal foil includes a metal framework that constitutes the porous portion. The metal framework is a metal portion that has a microstructure in the porous portion. The porous portion includes a plurality of pores (pits) surrounded by the metal framework. From the viewpoint of increasing the surface area and forming a dielectric layer in deep portions of the porous portion, the pore diameter (opening length) is less than 2000 nm, and may be 100 nm or more and 1500 nm or less.

The pores (pits) may be sponge-like pits or tunnel-like pits. Tunnel-like pits include pits that extend in the direction from the surface of the porous portion toward the core portion.

In the case of sponge-like pits, the pore diameter (opening length) is 600 nm or less, for example, and may be 50 nm or more and 500 nm or less. In the case of sponge-like pits, the average pore diameter Dp may be 80 nm or more and 400 nm or less, or 80 nm or more and 300 nm or less. An electrode foil including sponge-like pits is used for a low-voltage electrolytic capacitor, for example. Specifically, such an electrode foil is used for an electrolytic capacitor in which a chemical conversion foil that withstands a voltage of 200 V or less is used. In the case of tunnel-like pits, the pore diameter (opening length) is 1900 nm or less, for example, and may be 100 nm or more and 1800 nm or less. In the case of tunnel-like pits, the average pore diameter Dp may be 200 nm or more and 1700 nm, or 400 nm or more and 1400 nm or less. An electrode foil including tunnel-like pits is used for a medium to high voltage electrolytic capacitor, for example.

The electrode foil may include a dielectric layer that covers the metal framework constituting the porous portion including the group of recessed portions. In this case, the electrode foil can be used as an anode foil. The dielectric layer covers at least a portion of an outer surface (the main surface S) of the porous portion and a portion of inner wall surfaces of the pores and the recessed portions in the porous portion. That is, the dielectric layer is provided in such a manner as to cover at least a portion of the surface of the metal framework surrounding the pores and the recessed portions.

The thickness of the metal foil may be 10 μm or more, 60 μm or more, or 90 μm or more. When the metal foil is as thick as 100 μm or more, a large bending stress is applied to the electrode foil when the electrode foil is wound, and accordingly, the effect of distributing the bending stress by the group of recessed portions can be obtained noticeably.

The thickness of the dielectric layer may be 2 nm or more, 4 nm or more, 12 nm or more, or 24 nm or more. An electrode foil that includes a dielectric layer having a thickness of 12 nm or more can be used as an anode foil. An electrode foil that includes a dielectric layer having a thickness of 24 nm or more can be used as an anode foil in an electrolytic capacitor whose rated voltage is 20 V or more. When the dielectric layer is as thick as 24 nm or more, a large bending stress is applied to the dielectric layer when the electrode foil is wound, and accordingly, the effect of distributing the bending stress by the group of recessed portions can be obtained noticeably. The thickness of the dielectric layer is determined by measuring the thickness at 10 arbitrarily selected points on the dielectric layer with use of a cross-sectional image of the electrode foil taken along the thickness direction thereof with use of an SEM or a transmission electron microscope (TEM), and calculating the average of the measured values.

(Method for Producing Electrode Foil)

A method for producing the electrode foil according to the present embodiment includes a step of etching the metal foil and a step of forming the group of recessed portions in the etched foil, for example.

In the etching step, a surface of the metal foil containing a valve action metal is roughened by being etched to form the porous portion that is continuous to the core portion. Either electrolytic etching or chemical etching may be performed. For example, a band-shaped metal foil (having a width of 500 mm, for example) is etched.

For example, it is possible to mass-produce electrode foils that include porous portions including pores having a diameter (opening length) smaller than 2 μm through electrolytic etching. In the case of AC etching, it is possible to produce an electrode foil that includes a porous portion including sponge-like pits having a diameter of 1.5 μm or less. In the case of DC etching, it is possible to produce an electrode foil that includes a porous portion including tunnel-like pits having a diameter of 2 μm or less. AC etching is preferable because it is easy to make a large difference between the opening length of the pores and the opening length of the recessed portions in the porous portion.

In the step of forming the group of recessed portions, the group of recessed portions may be formed by pressing a jig including a plurality of protrusions against the metal foil having the roughened surface. Alternatively, it is also possible to form groups of recessed portions on both surfaces of the metal foil that have been roughened, by conveying the metal foil between a pair of rollers including a plurality of protrusions and pressing the pair of rollers against the metal foil. The groups of recessed portions may also be formed through laser processing, blasting, etching, or the like.

The method for producing the electrode foil may also include a step of forming slits in the etched foil. For example, a band-shaped etched foil having a width of 500 mm is divided into sections having a width of 1.5 mm or more and 40 mm or less by forming slits in the foil. The slits may be formed before or after the step of forming the group of recessed portions. In the step of forming slits, a roller for conveying the metal foil to a slitting machine and a roller for winding the slit metal foil are used. When a slitting width is as small as 10 mm or less, the metal foil may break due to tension or a bending stress applied to the metal foil while the metal foil is conveyed or wound by the rollers. In the case where the slits are formed after the step of forming the group of recessed portions, the metal foil is kept from breaking in the step of forming slits owing to the presence of the group of recessed portions.

The method for producing the electrode foil may also include a step of forming a dielectric layer that covers the metal framework constituting the porous portion including the group of recessed portions. The dielectric layer may be formed before or after the step of forming the group of recessed portions. In the step of forming a dielectric layer, an oxide film containing the valve action metal may be formed on the surface of the metal foil including the porous portion (the porous portion including the group of recessed portions) through anodization (chemical treatment).

The above-described method for producing the electrode foil may also include a step of conveying and winding the metal foil with use of rollers. When the metal foil includes the group of recessed portions, the metal foil is kept from breaking as a result of tension or a bending stress being applied to the metal foil when the metal foil is conveyed or wound by the rollers. Also, in this case, the stress is kept from concentrating in uneven portions or scratches formed in the electrode foil due to uneven portions or scratches in the surface of a roller, and breakage of the electrode foil due to concentration of the stress is suppressed. Also, the stress is kept from concentrating in uneven portions or scratches formed in the electrode foil due to particles or foreign matter that has intruded into a space between a roller and the metal foil, and breakage of the electrode foil due to concentration of the stress is suppressed.

The electrode foil for an electrolytic capacitor according to the present embodiment may be used as at least one of an anode foil and a cathode foil in a wound electrolytic capacitor or an anode body in a stacked electrolytic capacitor.

Figure 1:
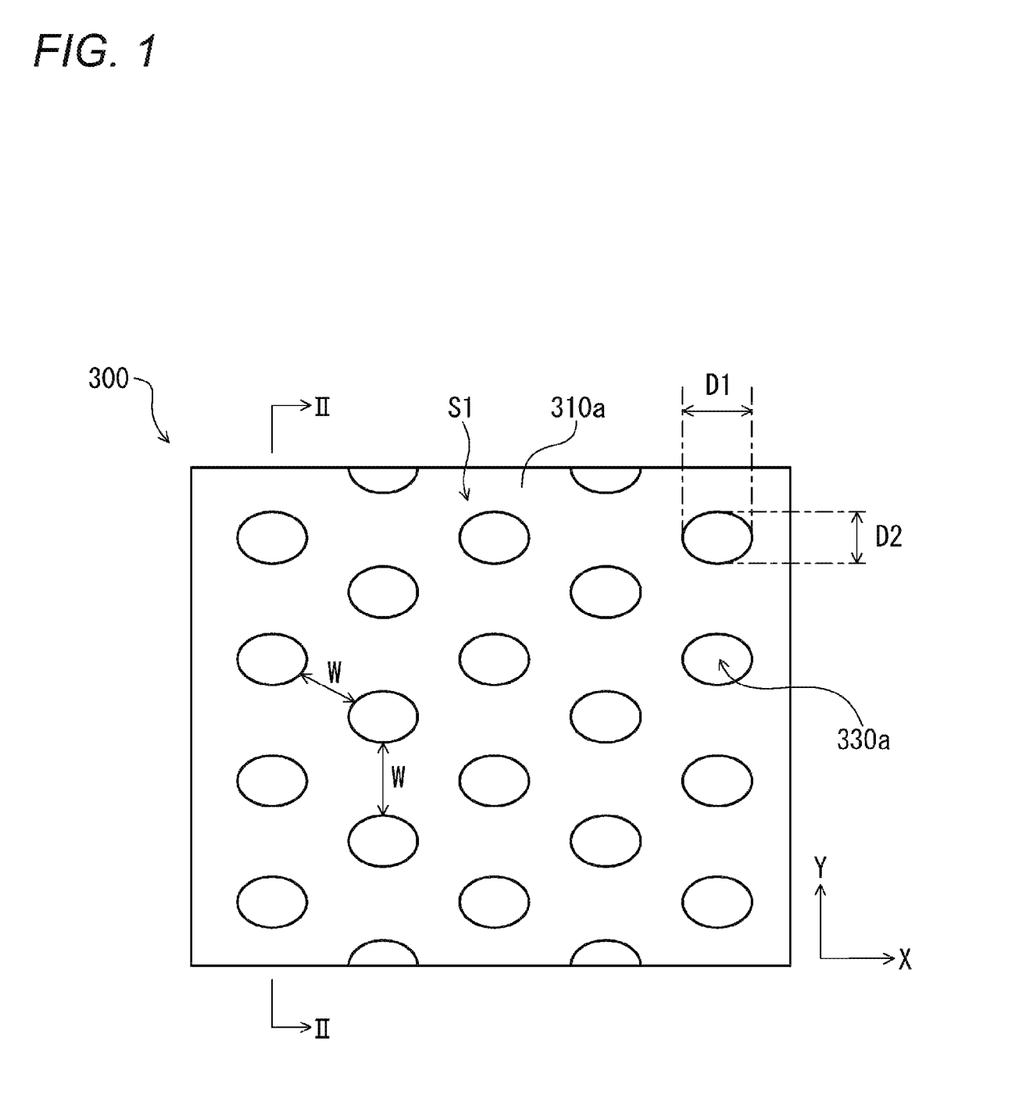
FIG. 1 is a front view schematically showing an example of an electrode foil for an electrolytic capacitor according to an embodiment of the present invention.
Figure 2:
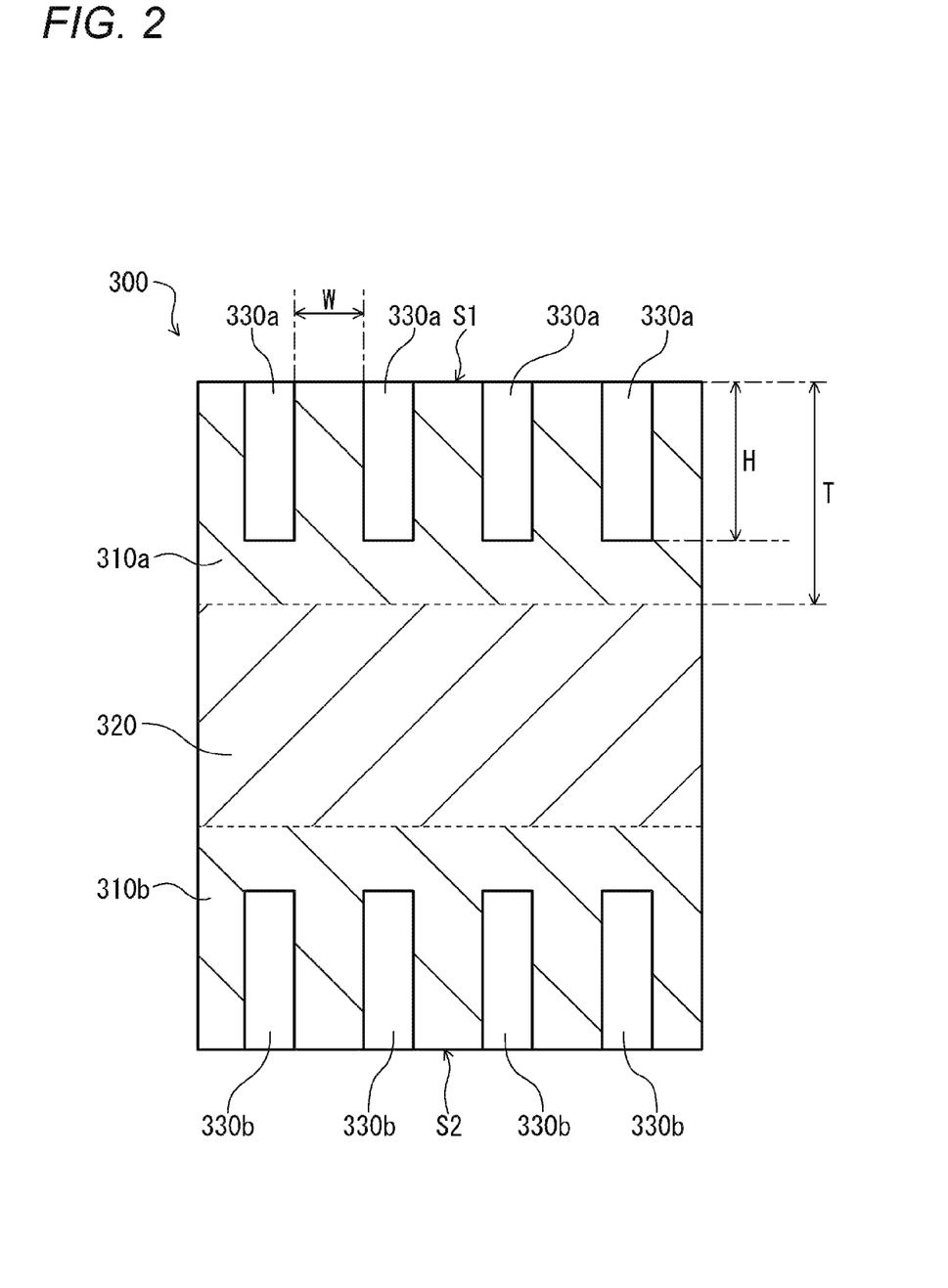
FIG. 2 is a cross-sectional view taken along the line II-II shown in FIG. 1.

Here, FIG. 1 is a front view schematically showing an example of the electrode foil for an electrolytic capacitor according to an embodiment of the present invention. A band-shaped electrode foil 300 (metal foil) shown in FIG. 1 has a first main surface S1 and a second main surface S2 that is opposite to the first main surface S1, and FIG. 1 shows a portion of the electrode foil 300 as viewed from the first main surface S1 side. The X direction and the Y direction in FIG. 1 respectively show the length direction and the width direction of the band-shaped electrode foil. FIG. 2 is a cross-sectional view taken along the line II-II shown in FIG. 1. FIG. 2 schematically shows a cross section of the electrode foil 300 shown in FIG. 1 taken along the thickness direction and the Y direction. Note that the electrode foil for an electrolytic capacitor according to the present invention is not limited to the electrode foil shown in FIGS. 1 and 2. The drawings are schematic drawings, and ratios between dimensions of the components (for example, a ratio between the size of recessed portions and intervals between the recessed portions) are different from actual ratios.

The band-shaped electrode foil 300 (metal foil) includes a first porous portion 310a and a core portion 320 that is continuous to the first porous portion 310a. The electrode foil 300 has the first main surface S1 in which pores (not shown) in the first porous portion 310a are open. The porous portion 310a includes a plurality of recessed portions 330a that are open in the first main surface 310S and have an elliptical column shape. The plurality of first recessed portions 330a are spaced apart from each other and distributed in a dot pattern in in-plane directions (the X direction and the Y direction) of the electrode foil 300. The pores in the first porous portion 310a have an opening length smaller than 2 μm, and the first recessed portions 330a have an opening length of 2 μm or more. The opening length of the recessed portions 330a may be 8 μm or more, or 10 μm or more, for example.

As shown in FIG. 1, the plurality of first recessed portions 330a are arranged in a staggered manner in the in-plane directions of the electrode foil 300. When the plurality of recessed portions 330a are arranged as shown in FIG. 1, the folding endurance (in particular, the folding endurance in the Y direction) and the tensile strength (in particular, the tensile strength in the X direction) of the electrode foil 300 are effectively improved.

Openings of the first recessed portions 330a shown in FIG. 1 have an elliptical shape, and the recessed portions are provided in such a manner that the major axis of the elliptical shape (the maximum length D1 of the openings) is substantially parallel with the X direction. Furthermore, the recessed portions are provided in such a manner that the minor axis of the elliptical shape (the minimum length D2 of the openings) is substantially parallel with the Y direction. In this case, the tensile strength in the X direction and the folding endurance in the Y direction tend to be particularly improved. It is sufficient that the ratio D2/D1 of the minimum length D2 to the maximum length D1 of the openings of the recessed portions 330a falls within the ranges described above as examples, and the ratio D2/D1 is 0.1 or more and 0.8 or less, for example.

The plurality of first recessed portions 330a are arranged at equal intervals. It is sufficient that the interval W between adjacent first recessed portions 330a falls within the ranges described above as examples, and the interval W is preferably 12 μm or more and 2000 μm or less, for example. It is sufficient that the ratio D1/W of the maximum length D1 of the first recessed portions to the interval W between the first recessed portions 330a falls within the ranges described above as examples, and the ratio D1/W is preferably 0.02 or more and 1.0 or less, for example. Also, it is sufficient that the ratio H/T of the depth H of the first recessed portions 330a to the thickness T of the first porous portion 310a falls within the ranges described above as examples, and the ratio H/T is preferably 0.16 or more and 1 or less, for example.

Figure 3A:
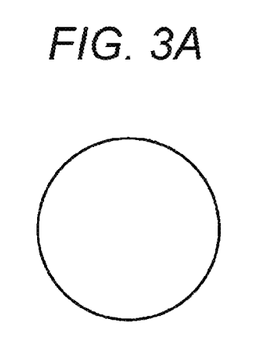
FIGS. 3A to 3C show a recessed portion whose opening has a circular shape, a recessed portion whose opening has a rectangular shape, and a recessed portion whose opening has a hexagonal shape, respectively.
Figure 3B:
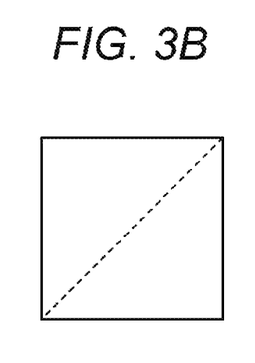
Figure 3C:
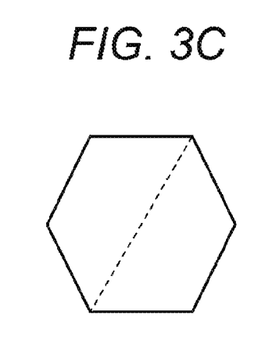
Figure 3D:
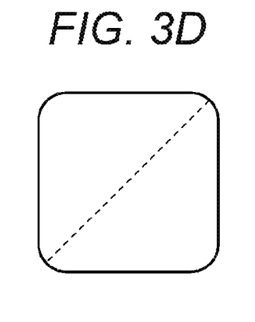
FIG. 3D shows a recessed portion whose opening has a rectangular shape in which all corners are rounded.
Figure 3E:
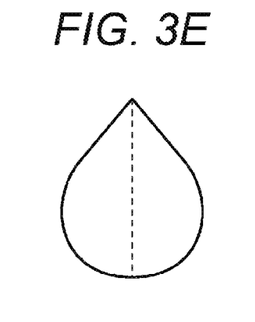
FIGS. 3E to 3G show recessed portions whose openings have drop shapes.
Figure 3F:
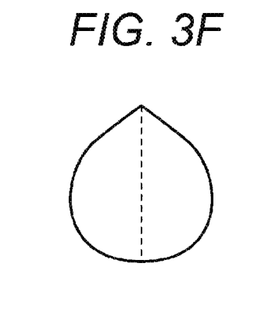
Figure 3G:
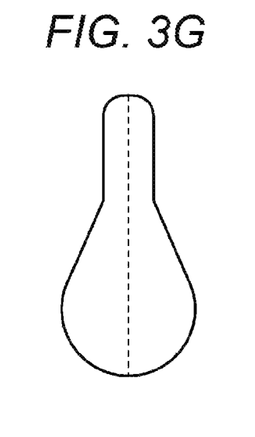
Figure 3H:
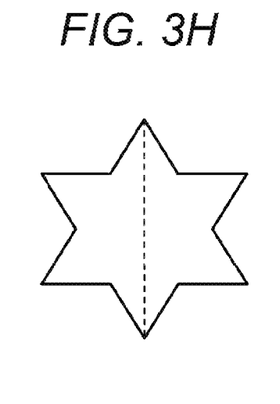
FIG. 3H shows a recessed portion whose opening has a hexagram shape. Note that broken lines shown in FIGS. 3B to 3H show maximum lengths of the openings.

Although openings of the recessed portions shown in FIG. 1 have an elliptical shape, the shape of the openings of the recessed portions is not limited to an elliptical shape. Openings of the recessed portions may have a circular shape, a rectangular shape, or a hexagonal shape shown in FIGS. 3A to 3C. Alternatively, openings of the recessed portions may have a rectangular shape in which all corners are rounded as shown in FIG. 3D or any of drop shapes shown in FIGS. 3E to 3G. Alternatively, openings of the recessed portions may have a hexagram shape shown in FIG. 3H. Recessed portions whose openings have the shapes shown in FIGS. 3B to 3H are preferably provided in such a manner that the direction in which the openings have the maximum length shown by dotted lines in FIGS. 3B to 3H is the X direction shown in FIG. 1.

The first recessed portions 330a have an elliptical column shape, but the shape of the first recessed portions is not limited to this example, and may also be a columnar shape other than the elliptical column shape, a cone shape, a pyramid shape, or the like. The plurality of first recessed portions 330a have the same shape and the same size as each other, but the plurality of first recessed portions may have different shapes and/or different sizes from each other. The arrangement pattern of the first recessed portions 330a is not limited to that shown in FIG. 1, and may be a square lattice pattern, for example. The direction in which the recessed portions 330a shown in FIG. 1 have the maximum length D1 is substantially parallel with the X direction, but a configuration is also possible in which the direction in which the first recessed portions 330a have the maximum length D1 is not parallel with the X direction. The first recessed portions are arranged at constant intervals W, but the intervals W between the first recessed portions may be varied in the X direction and/or the Y direction.

As shown in FIG. 2, the band-shaped electrode foil 300 (metal foil) includes the second porous portion 310b and the core portion 320 that is continuous to the second porous portion 310b. That is, the first porous portion 310a and the second porous portion 310b are arranged in such a manner as to sandwich the core portion 320. The electrode foil 300 has the second main surface S2 in which pores (not shown) in the second porous portion 310b are open.

The porous portion 310b includes a plurality of second recessed portions 330b that are open in the second main surface S2. The plurality of second recessed portions 330b are spaced apart from each other and distributed in a dot pattern in the in-plane directions of the electrode foil 300. The pores in the second porous portion 310b have an opening length smaller than 2 μm, and the second recessed portions 330b have an opening length of 2 μm or more. The second recessed portions are the same as the first recessed portions in the shape, size, interval, and arrangement pattern (hereinafter will also be referred to as "the shape and the like").

The first recessed portions 330a and the second recessed portions 330b are the same in the shape and the like, but may be different from each other in the shape and the like. For example, intervals between the first recessed portions may be smaller than intervals between the second recessed portions.

[Electrolytic Capacitor]

An electrolytic capacitor according to an embodiment of the present invention includes a wound body and an electrolyte. The wound body is obtained by winding together a band-shaped anode foil, a band-shaped cathode foil arranged opposite to the anode foil, and a separator arranged between the anode foil and the cathode foil. The electrode foil for an electrolytic capacitor according to an embodiment of the present invention is used as at least one of the anode foil and the cathode foil. That is, at least one of the anode foil and the cathode foil includes a metal foil that includes a porous portion and a core portion continuous to the porous portion. The metal foil has a main surface in which pores in the porous portion are open. The porous portion includes a plurality of recessed portions that are open in the main surface and distributed in a dot pattern in an in-plane direction of the metal foil. The pores in the porous portion have an opening length smaller than 2 μm, and the recessed portions have an opening length of 2 μm or more.

A height Lc of the wound body is 50 mm or less, for example, and may be 20 mm or less, or 15 mm or less. The height Lc of the wound body is substantially equal to the width of the electrode foil.

An electrode foil having a large width (for example, 30 mm or less) is used in the case where a product is large (for example, when the height Lc of the wound body is 30 mm or more). An electrode foil having a large width is likely to break when the electrode foil is twisted. Accordingly, when a group of recessed portions are provided in the electrode foil having a large width, the breakage of the electrode foil due to twisting is suppressed noticeably and the reliability of the large-sized product (for example, a large-sized capacitor including screw terminals or lead terminals) is improved.

On the other hand, an electrode foil having a small width (for example, 20 mm or less) is used in the case where a product is small (for example, when the height Lc of the wound body is 20 mm or less). An electrode foil having a small width is obtained by dividing an electrode foil having a large width (for example, 125 mm or more and 500 mm or less) into sections having a desired small width (20 mm or less) by forming slits. A stress applied to the electrode foil during formation of the slits is distributed owing to the presence of the group of recessed portions, and accordingly, formation of cracks due to the stress and resultant breakage of the electrode foil are suppressed, and the quality of the electrode foil having a small width is significantly improved. Also, breakage of the electrode foil due to tension generated when the electrode foil having a small width is conveyed by a roller is noticeably suppressed owing to the presence of the group of recessed portions in a process for producing the capacitor. Consequently, aging (repair formation) is efficiently performed in the production of the capacitor, properties of the capacitor such as a leakage current are stabilized, and the reliability of the small-sized product is improved.

A ratio Da/Lc of the average opening length Da of the recessed portions to the height Lc of the wound body may be $0.5 \times 10^{-4}$ or more and $2.4 \times 10^{-4}$ or less, or $1 \times 10^{4}$ or more and $2 \times 10^{-4}$ or less.

In the case where the electrode foil E is used as at least one of the anode foil and the cathode foil, the electrode foil E may be wound in the wound body in such a manner that the first main surface faces the outer circumferential surface side of the wound body. In the following description, a wound body including the electrode foil E wound in such a manner that the first main surface faces the outer circumferential surface side of the wound body will also be referred to as a "wound body A".

In the case of the wound body A, the number N1 of first recessed portions per 1 mm$^2$ of the first main surface may be larger than the number N2 of second recessed portions per 1 mm$^2$ of the second main surface. In the case of the wound body A, a bending stress is larger in the first porous portion (the first main surface side) than in the second porous portion (the second main surface side) of the electrode foil E. Accordingly, when the number N1 of first recessed portions is larger than the number N2 of second recessed portions, the effect of distributing the bending stress by the groups of recessed portions tends to be obtained efficiently. The ratio N1/N2 may be 1.02 or more and 2.0 or less, or 1.05 or more and 1.8 or less.

Figure 4:
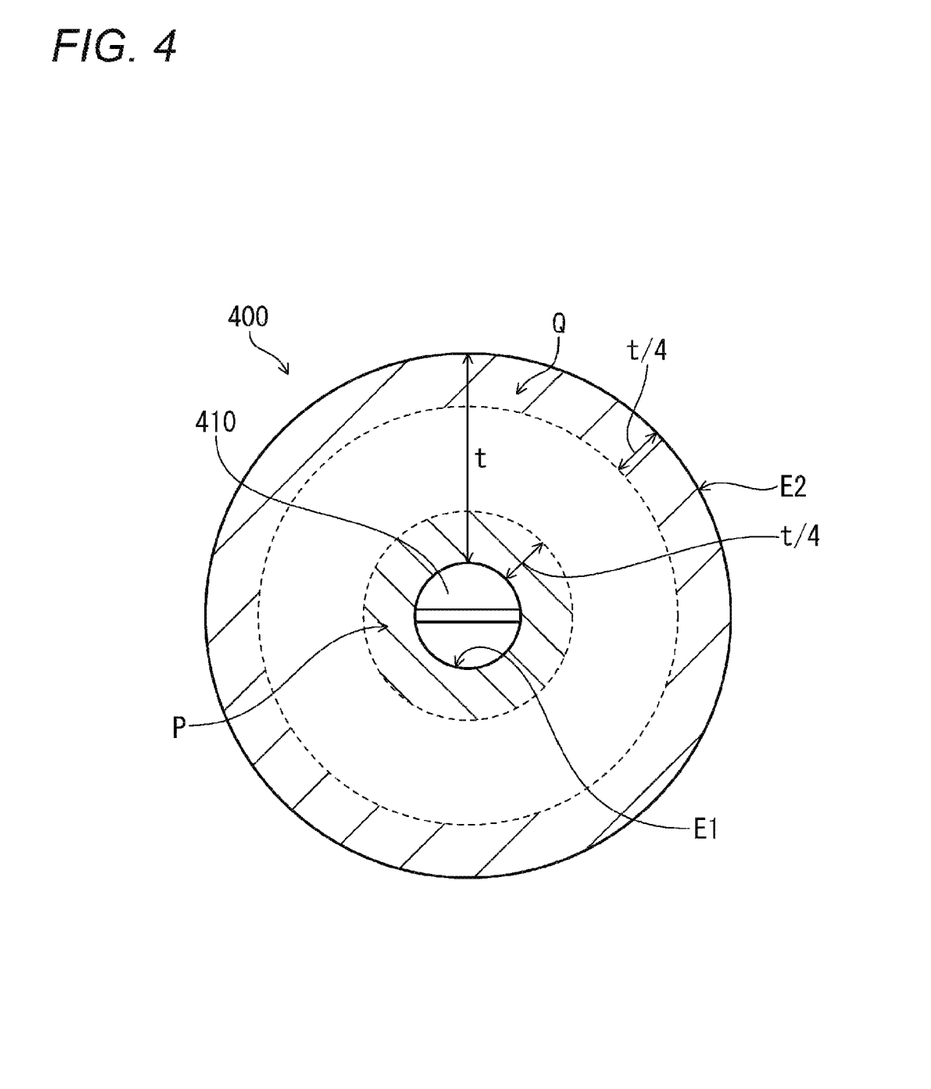
FIG. 4 is a diagram schematically showing an example of a wound body A as viewed from an end surface side.

A configuration is also possible in which the ratio N1/N2 is 1.05 or more and 1.8 or less in an inner circumferential surface side region P of the wound body A and/or an outer circumferential surface side region Q of the wound body A. Here, FIG. 4 is a diagram schematically showing an example of the wound body A as viewed from an end surface side. The wound body A is a wound body 400 obtained by winding an anode foil and a cathode foil with a separator arranged therebetween around a core 410. When the thickness of the wound body 400 in a radial direction from an innermost circumferential surface E1 to an outermost circumferential surface E2 is denoted by t, the region P is at a distance of (¼)×t or less in the radial direction from the innermost circumferential surface E1 of the wound body 400. The region Q is at a distance of (¾)×t or more in the radial direction from the innermost circumferential surface E1 of the wound body.

The number of first recessed portions per 1 mm$^2$ of the first main surface may be larger on the core side than on the outer circumferential surface side of the wound body A. A radius of curvature of the electrode foil E when the wound body A is viewed from the end surface side is smaller on the core side than on the outer circumferential surface side of the wound body A, and a bending stress applied to the first porous portion (the first main surface side) of the electrode foil E is larger on the core side than on the outer circumferential surface side of the wound body A. Accordingly, when the number of first recessed portions is increased on the core side rather than on the outer circumferential surface side of the wound body A, the effect of distributing the bending stress by the group of recessed portions tends to be obtained efficiently.

For example, the number of first recessed portions per 1 mm$^2$ of the first main surface may be increased in the inner circumferential surface side region P of the wound body A. In the case of the wound body A, a particularly large bending stress is applied to the first porous portion (the first main surface side) of the electrode foil E in the region P. Therefore, when the number of first recessed portions in the region P is increased, the effect of distributing the bending stress by the group of recessed portions tends to be obtained efficiently.

The number of second recessed portions per 1 mm$^2$ of the second main surface may be larger on the outer circumferential surface side than on the core side of the wound body A. The degree of compression of the second porous portion (the second main surface side) of the electrode foil E is smaller (the influence of bending of the electrode foil E is larger) on the outer circumferential surface side than on the core side of the wound body A. Therefore, when the number of second recessed portions is increased on the outer circumferential surface side rather than on the inner circumferential surface side of the wound body A, the effect of distributing the bending stress by the group of recessed portions tends to be obtained efficiently.

(Anode Foil)

The anode foil includes a metal foil including a porous portion and a core portion continuous to the porous portion and a dielectric layer covering the porous portion. The porous portion is formed by roughening a surface of the metal foil containing a valve action metal through etching, for example. The dielectric layer is obtained by forming an oxide film containing the valve action metal on the roughened surface of the metal foil through anodization (chemical treatment). Examples of the valve action metal include aluminum (Al), tantalum (Ta), and niobium (Nb). The metal foil may contain the valve action metal as an alloy or a compound containing the valve action metal.

The thickness of the anode foil is 60 μm or more and 200 μm or less, for example. The anode foil is relatively thick, and accordingly, when an electrode foil including a group of recessed portions is used as the anode foil, the effect of distributing a bending stress by the group of recessed portions tends to be obtained.

(Cathode Foil)

A metal foil that contains a valve action metal such as Al, Ta, or Nb can be used as the cathode foil. A surface of the metal foil may be roughened through etching as necessary. That is, the cathode foil may be a metal foil that includes a porous portion and a core portion continuous to the porous portion.

The thickness of the cathode foil is 10 μm or more and 70 μm or less, for example. The cathode foil is relatively thin, and accordingly, when an electrode foil including a group of recessed portions is used as the cathode foil, the effect of improving the tensile strength by the group of recessed portions tends to be obtained.

(Separator)

The separator is not particularly limited. For example, it is possible to use a nonwoven cloth containing fibers made of cellulose, polyethylene terephthalate, vinylon, or polyamide (for example, aliphatic polyamide or aromatic polyamide such as aramid).

(Electrolyte)

The electrolyte covers at least a portion of the anode foil (the dielectric layer), and is interposed between the anode foil (the dielectric layer) and the cathode foil. The electrolyte includes at least one of a solid electrolyte and a liquid electrolyte. In the case where the electrolyte includes a solid electrolyte, the electrolytic capacitor may include the solid electrolyte and a liquid electrolyte, or include the solid electrolyte and a nonaqueous solvent. In the following description, the liquid electrolyte and the nonaqueous solvent will also be collectively referred to as a "liquid component".

(Solid Electrolyte)

The solid electrolyte contains a conductive polymer. The conductive polymer is a π-conjugated polymer, for example. Examples of the conductive polymer include polypyrrole, polythiophene, polyfuran, and polyaniline. It is possible to use one type of conductive polymer alone, two or more types of polymers in combination, or a copolymer of two or more monomers. The conductive polymer has a weight-average molecular weight of 1000 to 100000, for example.

Note that polypyrrole, polythiophene, polyfuran, polyaniline, and the like referred to in the present specification respectively mean polymers that include polypyrrole, polythiophene, polyfuran, polyaniline, and the like as the basic structure. Accordingly, the terms polypyrrole, polythiophene, polyfuran, polyaniline, and the like also encompass derivatives of those polymers. For example, the term polythiophene encompasses poly(3,4-ethylenedioxythiophene), for example.

The conductive polymer can be doped with a dopant. The solid electrolyte may contain a dopant together with the conductive polymer. Examples of the dopant include polystyrene sulfonic acid. The solid electrolyte may further contain an additive as necessary.

The liquid component is in contact with the dielectric layer directly or via the conductive polymer. The liquid component may be a nonaqueous solvent or a liquid electrolyte (electrolyte solution). The electrolyte solution contains a nonaqueous solvent and an ionic material (a solute (for example, an organic salt)) dissolved in the nonaqueous solvent. The nonaqueous solvent may be an organic solvent or an ionic liquid.

A solvent that has a high boiling point is preferably used as the nonaqueous solvent. For example, it is possible to use polyol compounds such as ethylene glycol, sulfone compounds such as sulfolane, lactone compounds such as γ-butyrolactone, ester compounds such as methyl acetate, carbonate compounds such as propylene carbonate, ether compounds such as 1,4-dioxane, and ketone compounds such as methylethylketone.

The liquid component may contain an acid component (anion) and a base component (cation). A salt (solute) may be formed by the acid component and the base component. The acid component contributes to a coating film repair function. Examples of the acid component include organic carboxylic acids and inorganic acids. Examples of inorganic acids include phosphoric acid, boric acid, and sulfuric acid. Examples of the base component include primary to tertiary amine compounds.

An organic salt is a salt in which at least one of the anion and the cation includes an organic substance. Examples of the organic salt include trimethylamine maleate, triethylamine borodisalicylate, ethyldimethylamine phthalate, mono-1,2,3,4-tetramethylimidazolinium phthalate, and mono-1,3-dimethyl-2-ethylimidazolinium phthalate.

From the viewpoint of suppressing de-doping of the dopant from the conductive polymer (deterioration of the solid electrolyte), the liquid component preferably contains the acid component more than the base component. Also, the acid component contributes to the coating film repair function of the liquid component, and therefore, the liquid component preferably contains the acid component more than the base component. The molar ratio (acid component/base component) of the acid component to the base component is 1.1 or more, for example. From the viewpoint of suppressing de-doping of the dopant from the conductive polymer, for example, pH of the liquid component may be 6 or less, or 1 or more and 5 or less.

Figure 5:
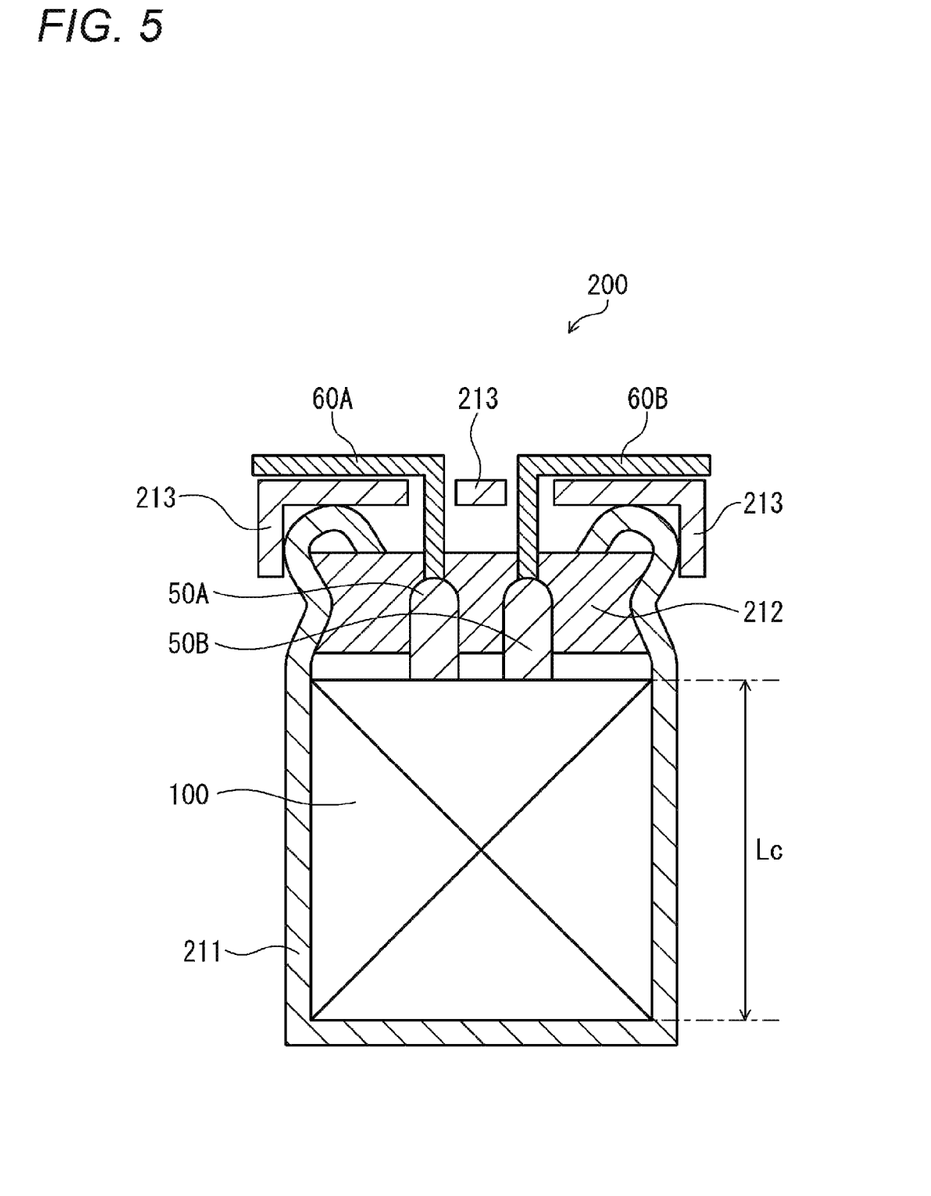
FIG. 5 is a cross-sectional view schematically showing an electrolytic capacitor according to an embodiment of the present invention.
Figure 6:
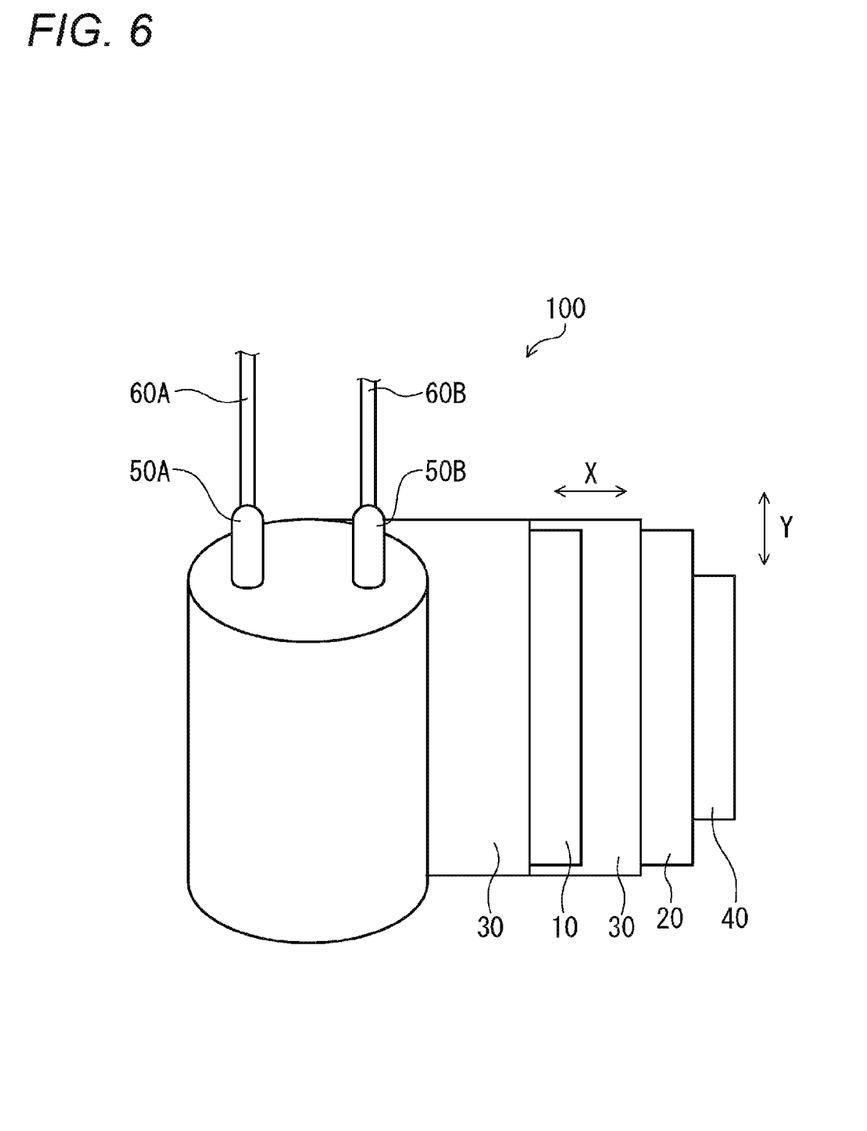
FIG. 6 is a perspective view schematically showing the configuration of a wound body shown in FIG. 5.

Here, FIG. 5 is a cross-sectional view schematically showing an electrolytic capacitor according to an embodiment of the present invention. FIG. 6 is a perspective view schematically showing the configuration of a wound body shown in FIG. 5. In FIG. 6, the X direction shows the length direction of a band-shaped anode foil 10 and a band-shaped cathode foil 20, and the Y direction shows the width direction of the anode foil 10 and the cathode foil 20.

An electrolytic capacitor 200 includes a wound body 100. The wound body 100 is obtained by winding together the anode foil 10 and the cathode foil 20 with a separator 30 arranged therebetween. An electrode foil according to the embodiment of the present invention is used as at least one of the anode foil 10 and the cathode foil 20. The height Lc of the wound body 100 is substantially equal to the lengths of the anode foil 10 and the cathode foil 20 in the width direction (Y direction).

End portions of lead tabs 50A and 50B are connected to the anode foil 10 and the cathode foil 20, respectively, and the wound body 100 is formed by winding the electrode foils to which the lead tabs 50A and 50B are connected. Lead wires 60A and 60B are connected to other end portions of the lead tabs 50A and 50B, respectively.

A winding end tape 40 is provided on the outer surface of a portion of the cathode foil 20 constituting the outermost layer of the wound body 100, and an end portion of the cathode foil 20 is fixed with the winding end tape 40. In a case where the anode foil 10 is prepared by cutting a large foil, chemical treatment may be further performed on the wound body 100 to provide a dielectric layer on the cut cross section.

The wound body 100 contains an electrolyte between the anode foil 10 (dielectric layer) and the cathode foil. The wound body 100 containing the electrolyte is obtained by impregnating the wound body 100 with a treatment solution containing the electrolyte, for example. The impregnation may be carried out in an atmosphere having a reduced pressure of 10 kPa to 100 kPa, for example. The treatment solution may contain a solid electrolyte and either an electrolyte solution or a nonaqueous solvent.

The wound body 100 is housed in a bottomed case 211 in such a manner that the lead wires 60A and 60B are located on the opening side of the bottomed case 211. The bottomed case 211 may be made of metal such as aluminum, stainless steel, copper, iron, or brass, or an alloy of any of these metals.

A sealing member 212 is arranged in the opening of the bottomed case 211 in which the wound body 100 is housed, the open end of the bottomed case 211 is swaged on the sealing member 212 to be curled, and a base plate 213 is arranged on the curled portion to seal the wound body 100 in the bottomed case 211.

The sealing member 212 is formed in such a manner that the lead wires 60A and 60B extend therethrough. The sealing member 212 is only required to be made of an insulating material, and is preferably constituted by an elastic member. In particular, it is preferable to use silicone rubber, fluororubber, ethylene propylene rubber, Hypalon rubber, butyl rubber, isoprene rubber, or the like, which has high heat resistance.

EXAMPLES

The following describes the present invention in more detail based on examples, but the present invention is not limited to the examples.

Examples 1 to 5

Electrode foils were produced to have the same structure as that shown in FIGS. 1 and 2 except that the recessed portions had a circular column shape. Specifically, both surfaces of a band-shaped Al foil having a thickness of 120 μm (length direction: 80000 mm, width direction: 500 mm) were roughened through etching. Thus, porous portions (thickness T: 45 μm) including sponge-like pits (average pore diameter Dp: 0.17 μm) were formed at both surfaces of the Al foil. The electrode foil was divided into sections having a width of 10 mm by forming slits, and then a plurality of recessed portions having a circular column shape (diameter (maximum length D1 of openings): 100 μm, depth H: 45 μm) were formed in both surfaces of the aluminum foil with use of a predetermined jig. Thus, electrode foils a1 to a5 that include porous portions including groups of recessed portions at both surfaces were obtained. The plurality of recessed portions were arranged in a staggered manner as in the example shown in FIG. 1, and intervals W between the recessed portions shown in FIG. 1 were changed to values shown in Table 1. The electrode foils of Examples 1 to 5 are denoted by a1 to a5.

Comparative Example 1

An electrode foil b1 was obtained in the same manner as in Example 1 except that the plurality of recessed portions were not formed in both surfaces of the aluminum foil.

The electrode foils of Examples and Comparative Example obtained as described above were each evaluated as follows.

[Evaluation: Folding Endurance]

The folding endurance of the band-shaped electrode foil in the width direction (the Y direction shown in FIG. 1) was measured in accordance with a test method (EIAJ RC-2364A) for electrode foils for aluminum electrolytic capacitors specified in standards of the Electronic Industries Association of Japan The folding endurance is shown as a relative value when the folding endurance of the electrode foil b1 of Comparative Example 1 is taken as 100. Table 1 shows the evaluation results.

TABLE 1

| Electrode foil | Maximum length D1 (μm) of openings of recessed portions | Intervals W (μm) between recessed portions | The number of recessed portions per 1 mm² of main surface (on each side) of electrode foil | D1/W | H/T | Folding endurance (relative value) |
|---|---|---|---|---|---|---|
| a1 | 30 | 500 | 4 | 0.06 | 1 | 107 |
| a2 | 30 | 400 | 5 | 0.08 | 1 | 110 |
| a3 | 30 | 300 | 9 | 0.10 | 1 | 120 |
| a4 | 30 | 200 | 19 | 0.15 | 1 | 127 |
| a5 | 30 | 50 | 156 | 0.60 | 1 | 147 |
| b1 | — | — | — | — | — | 100 |

The electrode foils a1 to a5 had higher values of the folding endurance than the electrode foil b1. In particular, the electrode foil a5 had significantly increased folding endurance.

Although the present invention has been described in terms of the presently preferred embodiment, it is to be understood that such a disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications that fall within the true spirit and scope of the invention.

INDUSTRIAL APPLICABILITY

The electrode foil according to the present invention is suitably used for an electrolytic capacitor for which high reliability is required.

REFERENCE SIGNS LIST

10: anode foil, 20: cathode foil, 30: separator, 40: winding end tape; 50A, 50B: lead tab, 60A, 60B: lead wire, 100, 400: wound body, 200: electrolytic capacitor, 211: bottomed case, 212: sealing member, 213: base plate, 300: electrode foil, 310a: first porous portion, 310b: second porous portion, 320: core portion, 330a: first recessed portion, 330b: second recessed portion

The invention claimed is:

1. An electrode foil for an electrolytic capacitor, comprising:
   a metal foil that includes a porous portion and a core portion that is continuous to the porous portion,
   wherein the metal foil has a main surface in which pores in the porous portion are open,
   the porous portion includes a plurality of recessed portions that are open in the main surface and distributed in a dot pattern in an in-plane direction of the metal foil,
   the pores in the porous portion have an opening length smaller than 2 μm,
   the recessed portions have an opening length of 2 μm or more, and
   an interval W between adjacent recessed portions among the recessed portions is 2 μm or more and 2400 μm or less.

2. The electrode foil for an electrolytic capacitor according to claim 1,
   wherein the opening length of the recessed portions is 2 μm or more and 120 μm or less.

3. The electrode foil for an electrolytic capacitor according to claim 1,
   wherein the number of recessed portions per 1 mm² of the main surface is 4 or more and 40000 or less.

4. The electrode foil for an electrolytic capacitor according to claim 1,
   wherein the metal foil has a band shape,
   the recessed portion are arranged in a length direction of the metal foil and a width direction of the metal foil, and
   the number Nx of recessed portions arranged in the length direction of the metal foil per 1 mm in the length direction of the metal foil and the number Ny of recessed portions arranged in the width direction of the metal foil per 1 mm in the width direction of the metal foil satisfy a relationship: Nx/Ny<1.

5. The electrode foil for an electrolytic capacitor according to claim 1,
   wherein, when adjacent recessed portions among the recessed portions each have an opening length D1 and are spaced apart from each other by an interval W, the opening length D1 and the interval W satisfy a relationship: $D1/W \leq 2$.

6. The electrode foil for an electrolytic capacitor according to claim 1,
wherein a ratio: Da/Dp of an average opening length Da of the recessed portions to an average pore diameter Dp in the porous portion is 20 or more.

7. The electrode foil for an electrolytic capacitor according to claim 1,
wherein openings of the recessed portions have at least one shape selected from the group consisting of a circular shape, an elliptical shape, a star shape, and a polygonal shape having at least one rounded corner.

8. The electrode foil for an electrolytic capacitor according to claim 1,
wherein the metal foil has a band shape, and
the metal foil has a width of 1.5 mm or more and 520 mm or less.

9. The electrode foil for an electrolytic capacitor according to claim 1,
wherein the porous portion includes a first porous portion and a second porous portion sandwiching the core portion,
the main surface includes a first main surface in which pores in the first porous portion are open and a second main surface in which pores in the second porous portion are open, and
the plurality of recessed portions include a plurality of first recessed portions that are arranged in the first porous portion and open in the first main surface and a plurality of second recessed portions that are arranged in the second porous portion and open in the second main surface.

10. The electrode foil for an electrolytic capacitor according to claim 9,
wherein the number of first recessed portions per 1 mm² of the first main surface is larger than the number of second recessed portions per 1 mm² of the second main surface.

11. The electrode foil for an electrolytic capacitor according to claim 1, further comprising:
a dielectric layer that covers a metal framework constituting the porous portion including the plurality of recessed portions.

12. The electrode foil for an electrolytic capacitor according to claim 11,
wherein the metal foil has a thickness of 10 μm or more.

13. The electrode foil for an electrolytic capacitor according to claim 11,
wherein the dielectric layer has a thickness of 2 nm or more.

14. An electrolytic capacitor comprising:
a wound body; and
an electrolyte,
wherein the wound body is obtained by winding together a band-shaped anode foil, a band-shaped cathode foil arranged opposite to the anode foil, and a separator arranged between the anode foil and the cathode foil,
at least one of the anode foil and the cathode foil includes a metal foil that includes a porous portion and a core portion that is continuous to the porous portion,
the metal foil has a main surface in which pores in the porous portion are open,
the porous portion includes a plurality of recessed portions that are open in the main surface and distributed in a dot pattern in an in-plane direction of the metal foil,
the pores in the porous portion have an opening length smaller than 2 μm,
the recessed portions have an opening length of 2 μm or more, and
the opening length of the recessed portions is 4 μm or more and 120 μm or less.

15. The electrolytic capacitor according to claim 14,
wherein the number of recessed portions per 1 mm² of the main surface is 10 or more and 62500 or less.

16. The electrolytic capacitor according to claim 14,
wherein the wound body has a height Lc of 20 mm or less.

17. The electrolytic capacitor according to claim 14,
wherein a depth H of the recessed portions and a thickness T of the porous portion satisfy a relationship: $0.067 \leq H/T \leq 1$.

18. The electrolytic capacitor according to claim 14,
wherein openings of the recessed portions have at least one shape selected from the group consisting of a circular shape, an elliptical shape, a star shape, and a polygonal shape having at least one rounded corner.

19. The electrolytic capacitor according to claim 14,
wherein the porous portion includes a first porous portion and a second porous portion sandwiching the core portion,
the main surface includes a first main surface in which pores in the first porous portion are open and a second main surface in which pores in the second porous portion are open, and
the plurality of recessed portions include a plurality of first recessed portions that are arranged in the first porous portion and open in the first main surface and a plurality of second recessed portions that are arranged in the second porous portion and open in the second main surface.

20. The electrolytic capacitor according to claim 19,
wherein, in the wound body, the electrode foil is wound in such a manner that the first main surface faces an outer circumferential surface side of the wound body, and
the number of first recessed portions per 1 mm² of the first main surface is larger than the number of second recessed portions per 1 mm² of the second main surface.

21. An electrode foil for an electrolytic capacitor, comprising:
a metal foil that includes a porous portion and a core portion that is continuous to the porous portion,
wherein the metal foil has a main surface in which pores in the porous portion are open,
the porous portion includes a plurality of recessed portions that are open in the main surface and distributed in a dot pattern in an in-plane direction of the metal foil,
the pores in the porous portion have an opening length smaller than 2 μm,
the recessed portions have an opening length of 2 μm or more, and
a depth H of the recessed portions and a thickness T of the porous portion satisfy a relationship: $0.067 \leq H/T \leq 1$.

22. An electrolytic capacitor comprising:
a wound body; and
an electrolyte,
wherein the wound body is obtained by winding together a band-shaped anode foil, a band-shaped cathode foil arranged opposite to the anode foil, and a separator arranged between the anode foil and the cathode foil, at least one of the anode foil and the cathode foil includes a metal foil that includes a porous portion and a core portion that is continuous to the porous portion, the metal foil has a main surface in which pores in the porous portion are open, the porous portion includes a plurality of recessed portions that are open in the main surface and distributed in a dot pattern in an in-plane direction of the metal foil, the pores in the porous portion have an opening length smaller than 2 μm, the recessed portions have an opening length of 2 μm or more, and an interval W between adjacent recessed portions among the recessed portions is 2 μm or more and 2400 μm or less.

23. An electrolytic capacitor comprising:

a wound body; and an electrolyte, wherein the wound body is obtained by winding together a band-shaped anode foil, a band-shaped cathode foil arranged opposite to the anode foil, and a separator arranged between the anode foil and the cathode foil, at least one of the anode foil and the cathode foil includes a metal foil that includes a porous portion and a core portion that is continuous to the porous portion, the metal foil has a main surface in which pores in the porous portion are open, the porous portion includes a plurality of recessed portions that are open in the main surface and distributed in a dot pattern in an in-plane direction of the metal foil, the pores in the porous portion have an opening length smaller than 2 μm, the recessed portions have an opening length of 2 μm or more, and a ratio: Da/Lc of an average opening length Da of the recessed portions to a height Lc of the wound body is $0.5 \times 10^{-4}$ or more and $2.4 \times 10^{-4}$ or less.

* * * * *